Sept. 8, 1959  R. W. ERWIN  2,903,243
EMULSION TREATER
Original Filed July 12, 1955  3 Sheets-Sheet 1
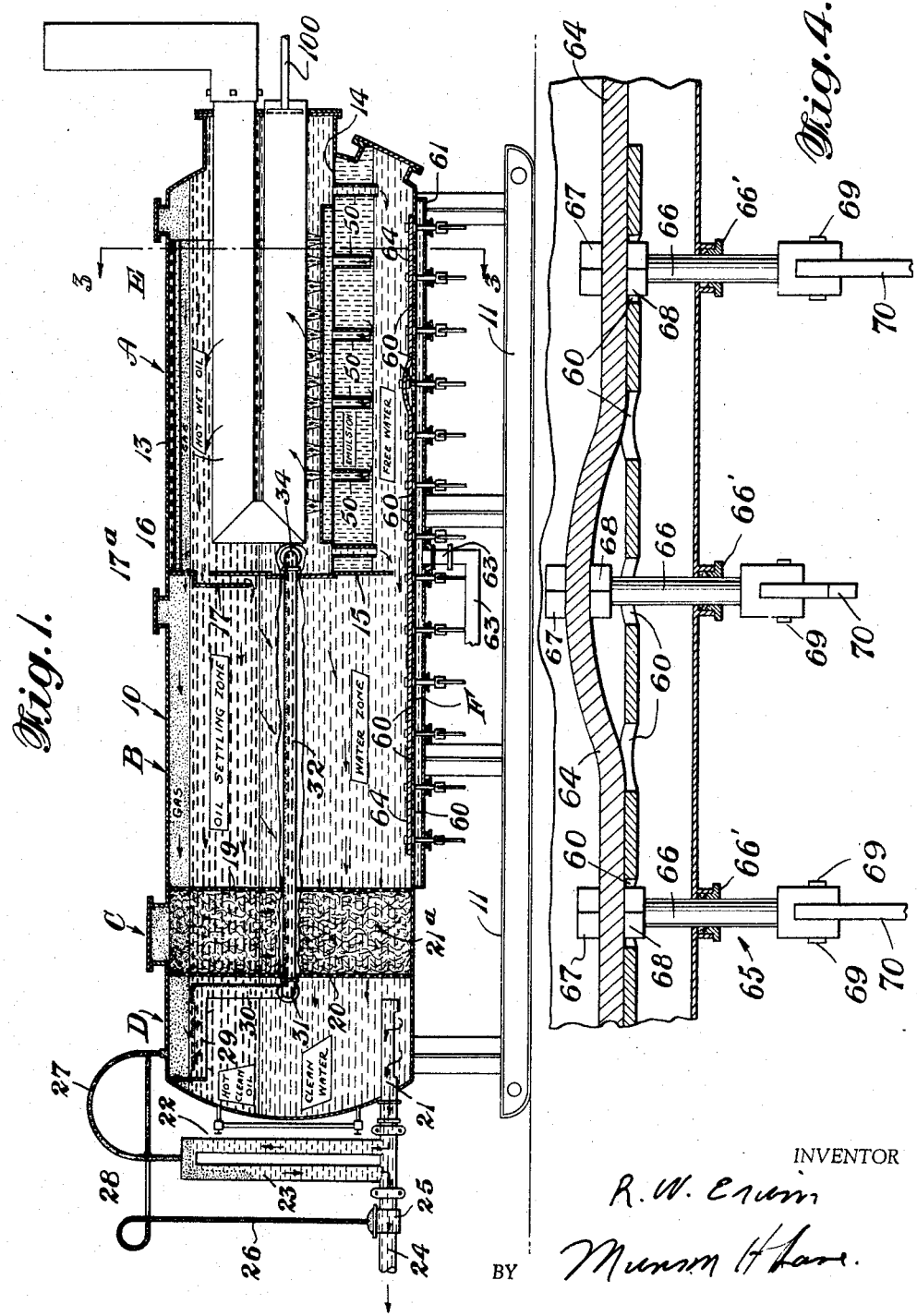
INVENTOR
R. W. Erwin
BY Munson H Lane
ATTORNEY

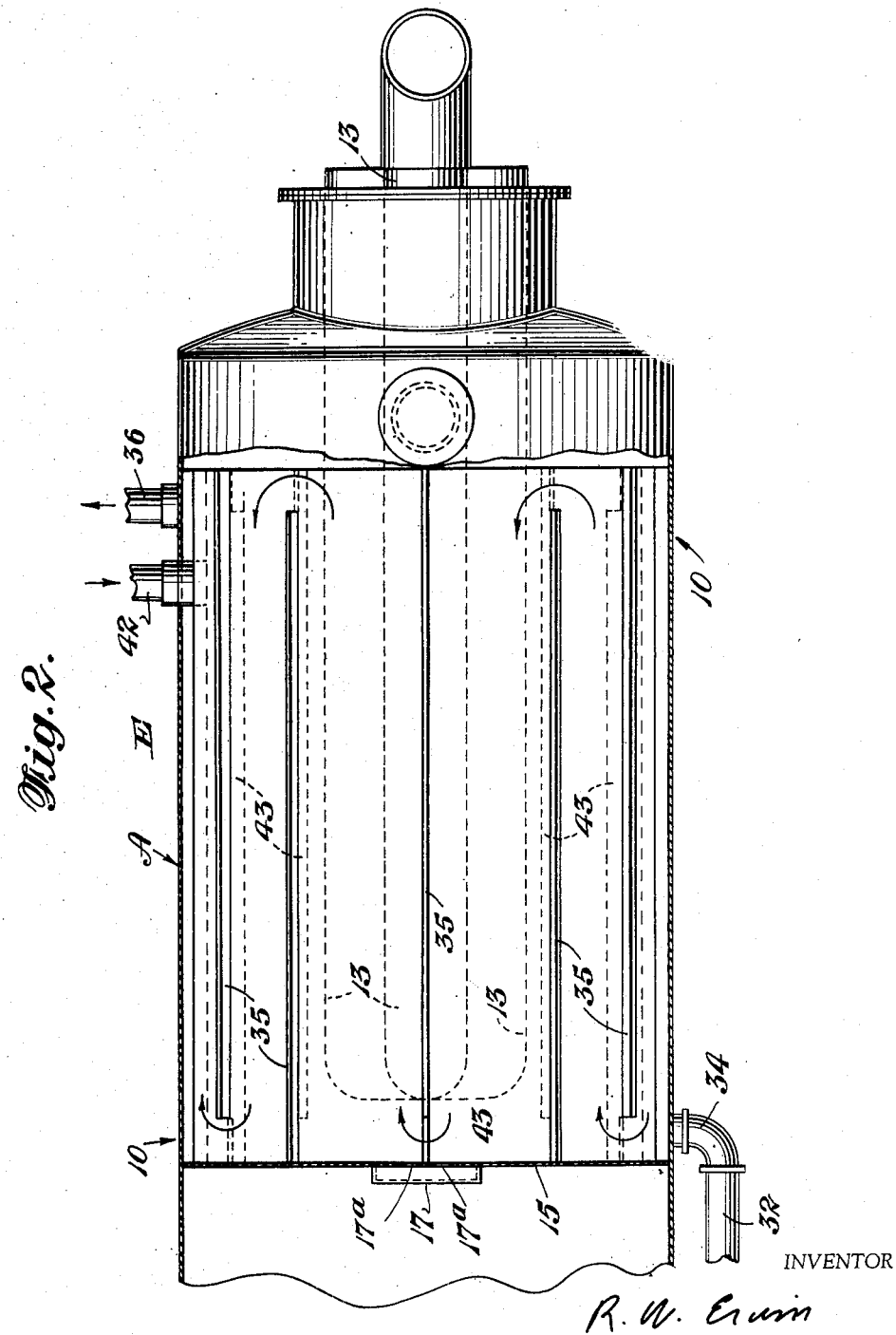

Sept. 8, 1959  R. W. ERWIN  2,903,243
EMULSION TREATER
Original Filed July 12, 1955  3 Sheets-Sheet 3
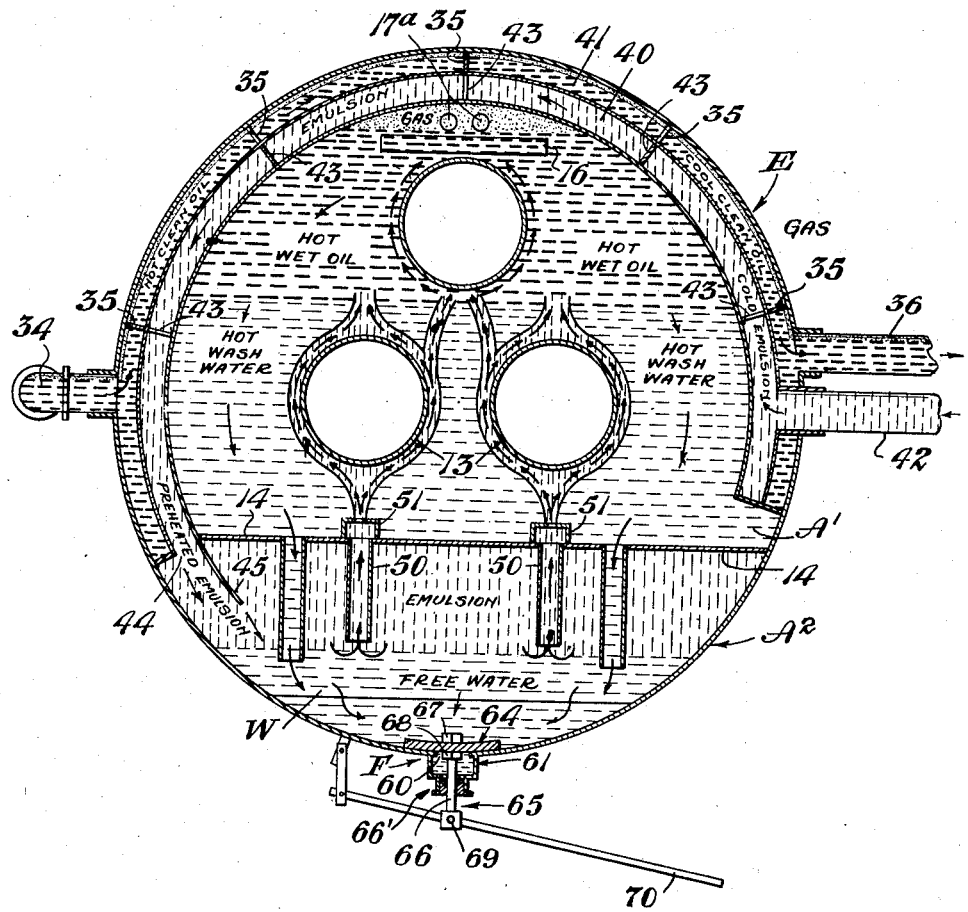
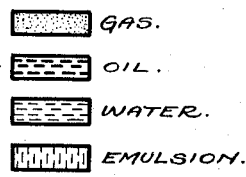
INVENTOR
R. W. Erwin
BY Munn H Lane
ATTORNEY

United States Patent Office 2,903,243
Patented Sept. 8, 1959

2,903,243

EMULSION TREATER

Ransome W. Erwin, Fort Worth, Tex., assignor to Salt Water Control, Inc., Fort Worth, Tex., a corporation of Texas Original application July 12, 1955, Serial No. 521,553. Divided and this application February 19, 1957, Serial No. 644,961

7 Claims. (Cl. 257—1)

The invention relates primarily to improvements in emulsion treaters of the general type disclosed in my Patents Nos. 2,601,903 and 2,601,904, dated July 1, 1952, although some of the individual features of the present invention are capable of broader application.

The present application is a division of application Serial No. 521,553, filed July 12, 1955, entitled Emulsion Treater.

In accordance with the disclosure of my prior patents referred to above an oil and water emulsion under pressure and containing gaseous constituents is subjected to heating, settling, baffling and filtering operations in order to separate the water from the oil and gaseous portions of the emulsion, the water being withdrawn from the treater separately from the oil and gas. The emulsion may be derived from a flowing oil well or other source.

The emulsion treaters of my prior patents are of the horizontal type and each includes a removable heating unit comprising a plurality of interconnected tubular elements heated by gas burners or the like, the heating unit being located at one end of the treating casing, to which heating unit the emulsion entering the treater is subjected to initially separate the gas, oil and water into separate layers, following which each layer is subjected to settling and/or filtering treatments to effect more complete separation, after which the oil and gas and water are removed from the discharge end of the treater remote from the heater and the hot oil leaving the treater is cooled by heat interchange with the entering emulsion by means of a suitable heat interchanger surrounding the emulsion inlet end of the treater.

The construction herein shown follows the same general arrangement as my prior patents, but includes among other features (a) improvements in the heat interchange construction and arrangement, (b) improvements in the oil and water heating unit or tubular elements thereof, and (c) improved means for removing sediment from the bottom of the treater, which means may be referred to as a selective sediment bleeder. These features will first be generally discussed in order and with advantages pointed out, and will then be illustrated in their application to a specific horizontal oil treater.

Heat interchange arrangement

In accordance with my present improvement the heat interchanger is applied to the upper part only of the inlet end of the treater so as to more effectively utilize the heat from the heating unit which is located in the portion of the inlet end, and also to leave the bottom of the treater readily accessible for removal of sediment. The hot clean oil and gas from the discharge end of the treater are passed to one side of the outer portion of the heat interchanger and are caused to pass back and forth lengthwise of the heat interchanger by means of suitable baffles or spacers before finally leaving the heat interchanger from the opposite side from which the oil and gas enter such heat interchanger, having in the meantime been cooled by heat interchange with the entering oil and water emulsion. Such emulsion enters an inner metal jacket contacting the oil jacket on the outside and hot water and oil layers on the inside, and passes in a zig zag arrangement in countercurrent relation to the oil and water inlet until it finally enters an emulsion zone in the treater below the heating zone thereof. In this manner full use is made of the heat of the clean outgoing gas and oil, and by reason of the fact that gas is included with the oil the heating zone is insulated so that no heat is wasted.

Oil and water heating unit comprising coated tubular elements

This improvement in heating elements for heating and treating mixtures of oil and water, especially mixtures of crude petroleum and mineral-containing formation waters, is primarily concerned with mineral scale prevention. In heating or treating mixtures of petroleum and water, usually mineral-containing brines, it is common practice to immerse varied shaped furnace or heating elements in the body of liquid being treated in a container or vessel. The source of heat is usually natural gas or fuel oil combustion, the hot gases transmitting heat through the steel wall of the heating element directly to the oil-water mixture itself. Common practice is to immerse the heating element in the water layer or zone of the heating vessel, heat the water itself, and transmit the heat to the oil by passing the oil upward in streamlets through the body of the heater water. Some treating methods, including those shown in my Patents Nos. 2,261,101, 2,601,903 and 2,601,904, emphasize a direct washing of the water immersed heating element with these oil streamlets in order to give more direct heating of the oil itself and in order to lubricate the heating element surface to minimize mineral scale formation. This method has proved to be beneficial in some cases, but only partially so where scale prevention is concerned. It is well known that an insoluble calcium carbonate is formed by heat breakdown of soluble calcium bicarbonates usually contained in earth formation waters. Most steel or metallic surfaces are by nature hydrophilic or preferentially water wettable, unless treated to be otherwise; hence a steel or metallic heating element submersed in water will contain water films on its surfaces even though oil streams are passing by it. If not violently disturbed these water films become superheated above the temperature of the water body, forming calcium carbonate precipitates which form and grow on the heating element surface. This coating of calcium carbonate acts as an absorbent to detain or retain more water which, in turn is overheated, forming still more precipitates. The final results, if the deposit is not removed mechanically, are insulation of the heating element, overfiring, and final burnout of the heating element.

I have found that treating the liquid exposed surface of a heating element to render it preferentially oil wettable, in combination with an oil wash while submerged in a water bath or medium, not only prevents formation of mineral scale accumulations on the heating element surface, but actually prevents the usual mineral precipitation itself. This rendering preferentially oil wettable of the heating element surface exposed to oil and water may be accomplished in several conventional ways. It may be treated by coating with any of several silicone compounds, well known in the art of oil wetting or waterproofing, that are permanent, stable, and heat cured to render them less susceptible to temperatures up to the boiling temperatures involved treating oil and water mixtures, such temperatures being sometimes as high as 250° to 300° F. Another very successful method of treatment, one which also protects the metallic heating element from chemical and electrolytic corrosion, is to sand blast the metal surface clean, then coat with several coats of a suitable thermosetting plastic such as epoxy or phenol formaldehyde resins, and oven bake the resin at 400° F. Details of the resin coating and baking operation are unnecessary here as this is a standard practice well known in the industry. Any suitable method for applying a coating may be employed as, for example, by dipping, spraying, brushing or the like, followed by a baking operation to set the plastic coating, as is well known to those skilled in the art.

Test results:

A pipe type tri-tube heating element as described in my Patents Nos. 2,495,673, 2,601,903 and 2,601,904 was coated with a high bake phenolic formaldehyde resin. This element was inserted into the chamber, which also was coated with a phenolic formaldehyde resin, of a horizontal emulsion treater generally similar to that described in my Patent No. 2,601,904. This treater was tested in an oil field which produces oil and much brine, and which contains so much soluble calcium bicarbonate that the treater had to be opened and cleared of lime scale deposits every three or four months. The scale would form on the heating element, build up, slough off and pile up beneath the element. Many anti-scaling remedies were tried, such as chemical treatment of the brine and magnesium anodic treatments, but with no appreciable success. Only expensive shut-down, removal of heating element and manual cleanout of scale every three or four months would permit continued operation. Subsequently the treater was put in line with the plastic treated firebox and heating chamber. After four months operation it was noted that the treater was heating the oil and water as easily as at first, indicating non-scaling of the heating element. After six months operation it was opened and inspected. There was no scale on the heating element (it was clean and oily), the plastic coating seemed quite intact, and even more significant, there was no calcium carbonate scale or sediment on the floor beneath the heating element. Obviously, the precipitates were not forming. It was interesting to note, however, that scale approximately ¼" thick had formed on that portion of the plastic coated interior of the heating-wash chamber which received no oil washing. This scale was not tight, and came loose with little mechanical effort. It was concluded that the plastic discouraged adhesion of the scale, but did not prevent its formation where there was no oil washing to keep the surfaces oil wet as is done by design of the heating element itself. Finally it was concluded that the combination of oil wettable surface, submerged in water, subjected to washing by oil is the key to mineral scale or precipitate prevention in oil-water mixture heating. This test treater was inspected at intervals with the same findings each time. At the end of the test it was safely concluded that this method of treatment was highly satisfactory, and that the plastic treatment was economical even if it should require recoating at infrequent intervals.

Among the objects of this phase of the invention are:

(1) To prevent formation of insoluble mineral scale and precipitates due to overheating water films in heat treating oil-water mixtures.

(2) To minimize chemical and electrolytic corrosion of exposed surfaces in oil-water mixture heat treating systems by rendering surfaces permanently oil wettable and washing same with insulating coat of oil.

(3) To provide more efficient transfer of heat directly to oil being heated in oil-water mixture heat treating systems by elimination of mineral scale deposits on the heating element and keeping the element wet with oil, though immersed in water.

(4) To prevent burn-out of the heating elements.

(5) To heat oil and water more efficiently with less B.t.u. consumption.

(6) To minimize costly shutdown and cleanout of oil-water treating system.

(7) To protect the heating element from costly electrolytic and chemical corrosion.

*Sediment removing means—Selective sediment bleeder for horizontal emulsion treater*

The third general feature of my invention relates to the removal of the sediment which tends to collect at the bottom of the horizontal treater, particularly in the heating and settling zones of such treater, such sediment removal being accomplished according to my invention by the use of what I choose to term a selective sediment bleeder which is especially adapted for use with an emulsion treater of the horizontal type.

The use of horizontal, cylindrical vessels or tanks for handling fluids subject to sediment fall-out has always been hampered by the difficulty of bleeding or draining such sediment from the vessel, which is a much more difficult problem than that which is involved where using a vertical vessel with a coned or dished bottom. It is obvious that in a vertically disposed vessel the sediment falls into the bottom cone where it may be bled off through an opening usually in the center of the bottom. In a horizontally disposed cylindrical vessel the sediment usually drops out throughout the length of the vessel. To drain such sediment there are usually multiple drain openings and valves located at close intervals throughout the length of the vessel. This, of course, is quite expensive and still not adequate, as only a small spot is drained clean. If some sort of perforated drain or pick-up pipe is used this is subject to becoming clogged and unworkable. Other recourses in such instances are violent agitation in the vicinity being drained; or shut-down of process, drainage of vessel and manual cleanout. The drop out of mud and sand, for example, in horizontal emulsion treaters, and the expense and difficulty of removing the same, have tended to some extent to off-set the many advantages that these horizontal treaters have over vertical ones. Thus, to fully realize all the many benefits to be derived from horizontal treating and settling processes I have provided beneath the longitudinal center of the treater a sediment and sand receiving channel or trough having an outlet pipe leading therefrom to a sand pit or the like, communication between the treater tank and the trough being provided by means of aligned apertures in the bottom of the tank, which are normally covered by a longitudinally extending flexible belt of suitable rubber-like material such as neoprene, portions of which belt above the aperture are adapted to be selectively opened by manual means accessible from the exterior of the tank. Thus, in effect, the belt and operating means therefor constitute selectively operating valve mechanisms for draining sediment from the bottom of the tank. This arrangement has the following advantages, among others:

(1) As contrasted to agitation of sediment by gas, especially in emulsion treating which disturbs the whole treating and settling process, this method permits mechanical agitation of sediment of bleeding off while the treating equipment is in full use.

(2) The equipment operator can bleed off the sediment with ease and in a minimum of time.

(3) The bleed-off arrangement is rugged, simple and foolproof.

(4) It provides selective full valve drainage for all parts of the vessel bottom, using only one drain line valve.

(5) The first cost of the sediment bleeder is not excessive compared to other bleeding methods commonly employed, and the savings in time and labor for general manual clean-out very quickly will pay out this first cost.

The invention will be more readily understood by reference to the accompanying drawing and the following detailed description, in which a horizontal emulsion treater embodying the various features of my invention is shown by way of illustration rather than by way of limitation.

In the drawings:

Fig. 1 is a vertical longitudinal section through my improved treater, parts being broken away and others being shown in elevation;

Fig. 2 is a top plan view of the jacketed heating end of my heater on a larger scale than Fig. 1, part of the outer jacket being broken away to show the baffles;

Fig. 3 is a vertical transverse section on line 3—3 of Fig. 1 and on a larger scale than Fig. 1;

Fig. 4 is a detail longitudinal section on an enlarged scale showing a portion of the sediment trough and a selective sediment bleeder arrangement used in connection therewith.

The apparatus as a whole and its mode of operation are generally similar to what is disclosed in my prior Patents Nos. 2,601,903 and 2,601,904, particularly the former, and accordingly only a brief description of its general construction and operation will be necessary, reference being had to said prior patents for a further understanding thereof.

As shown, the treater comprises an elongated horizontal tank 10 mounted on skids or the like 11 so as to permit it to be moved from place to place. The tank 10, which constitutes the main treating vessel, is divided lengthwise into four main zones designated from right to left as the entering and heating zone A, the settling zone B, the filtering zone C, and the discharge zone D, through which zones the fluids undergoing treatment are passed successively from their entry into the system to their removal therefrom, it being understood, however, that hot oil and gas leaving the treater and the cold emulsion entering the system are passed in heat interchange relation through a heat exchanger E located at that part of the zone A in which the heating unit 13 is located.

The entering and heating zone A is sub-divided into an upper or heating zone A', and a lower zone or chamber $A^2$ by means of a partition 14 more fully described in my Patent No. 2,601,903. Separation of free water from the emulsion takes place in the zone $A^2$ and two distinct layers are formed, the lower layer being free water and the upper layer below the partition 14 being emulsion.

The entering zone A is divided from the settling zone B by means of a partition 15 which terminates short of the bottom of the tank so as to provide access between the water layer at the bottom of the zone A and the water layer in zone B. The partition 15 is provided with an upper opening 16 and a spreader box 17 permitting passage of hot oil from zone A to zone B. Apertures $17^a$ are also provided above the opening 16 to interconnect the gas layers in the top portions of zones A and B. The filtering zone C is separated from zones B and D by means of perforated walls 19 and 20 which serve to retain filtering materials $21^a$, such as glass fiber, excelsior or the like. No sediment is permitted to pass beyond the zone B. From the discharge zone D, which is also a settling zone, water is drained off through outlet pipe 21 and water legs 22, 23 to discharge pipe 24 having a diaphragm dump valve 25 therein controlled by gas equalizer pipe 26, which pipe connects with gas equalizer pipe 27, which in turn connects the gas zone at the top of the tank with the interconnecting portion 28 between the tops of the water legs.

From the upper portion of the discharge zone D hot clean oil and gas are withdrawn through an overflow outlet 29 and down pipe 30 which emerges from the side of the tank at 31 and passes externally along the line 32 until it enters the outer jacket of the heat interchanger E at 34 and flows in a zigzag path back and forth lengthwise of the tank by reason of a series of spaced baffle plates 35, until the stream of now cooled oil and gas emerges from the treater at 36 and is passed to a suitable place of storage (not shown).

The heat interchanger

As shown, the heat interchanger E comprises inner and outer jacket portions 40 and 41 extending about the heating zone A' and terminating approximately at the lower water knock-out zone $A^2$. The outer jacket 41 receives the outgoing oil and gas, as previously described, and the inner jacket 40 receives the incoming emulsion which enters the jacket under pressure at 42, and after a zigzag passage back and forth lengthwise of the jacket by reason of baffles 43 similar to the outer baffles 35 enters the lower water knock-out zone $A^2$ at 44, being guided thereto by an extension 45 of the inner wall of jacket 40. The arrangement of baffles 35 and 43 is best shown in Fig. 2.

In the knock-out chamber $A^2$ free water separates out from the emulsion and sinks to the bottom to form layer W in the bottom of zone $A^2$, which layer communicates with water in the bottom zone B through the opening beneath partition 15 as previously described, and from this combined water zone sediment may be removed by the aid of my selective bleeder arrangement F at the bottom of the tank, which will be more fully described hereinafter.

The preheated emulsion from the heat interchanger E entering the treater at 44 forms an upper layer in the zone $A^2$ above the water layer W, and passes upwardly through pipes 50 extending through partition 14 and thus through spreaders 51 into the upper zone A' of the treater, and then the emulsion passes upwardly around the two lower fire tube elements of the heater unit 13, as best indicated in dotted lines in Fig. 3, thereby causing separation of the emulsion into its water, oil and gas components, the water collecting in a lower layer, the gas in a small upper layer, and the oil collecting in the intermediate layer surrounding the uppermost fire tube of the heating unit. Thus it will be apparent that the three elements of the heater unit are at all times surrounded either by the upwardly flowing emulsion which contains an oil component and which contacts the two lower elements, or by the relatively clean oil in the upper portion of the zone A' as in the case of the uppermost tubular element of the heater.

The heater unit

In accordance with my invention as previously set forth the fire tubes of the heater unit are pretreated by coating on the liquid side with a suitable coating which renders them preferentially oil wettable instead of water wettable, thereby protecting them from chemical and electrolytic corrosion, and to a large extent preventing the formation of hard carbonate scale. The coating may be of silicone compounds, phenolic or epoxy resins, or other suitable thermosetting plastic material. Thus the oil constituent of the emulsion rather than the water wets the two lowermost fire tubes although such tubes are actually located in the water or brine layer. The uppermost tube is located in the oil area, though some water may remain in such area, but since the uppermost tube is likewise preferentially oil coated, corrosion and scale formation are largely prevented.

As previously described, the clean oil passes from the zone A into zone B through the opening 16 and thence through filter chamber C into a second settling or discharge chamber or zone D. The gas likewise follows a similar path above the oil layer.

Sediment removal

I have found in practice that large quantities of sediment, sand or the like tend to accumulate in the lower portion of zones A and B, zones C and D being largely free from sediment owing to the presence of the screens and filtering material in zone C and also to the fact that settling has largely been completed in the first two zones A and B. For this purpose I have provided what I choose to call a selective sediment bleeder F extending along the longitudinal center of the bottom of zones A and B. As shown the bottom of the tank in these zones is provided with spaced perforations or openings 60, and beneath the perforations there is provided a trough or channel 61 U-shaped in cross section and having an offtake pipe 63 leading from the bottom of valve 63' thereof to a disposal pit or the like (not shown). Within the tank a flexible belt 64 is provided which normally covers the apertures and which is preferably composed of neoprene or other suitable chemically resistant rubber-like material. A plurality of means, each generally designated by reference numeral 65, serve to selectively raise portions of the belt at the desired locations to permit accumulated sand, sediment and the like to pass from the bottom of the treater through one or more openings 60 into the trough 61, thence through valve 63' (which has been opened) and through drain pipe 63 to the disposal pit. The belt thus serves as a selectively operable valve. One such belt lifting or valve operating mechanism will be described as illustrative.

As shown the belt lifting or valve actuating means 65 comprises a reciprocable rod 66 passing through stuffing box 66' and then through the trough and connected at its upper end to the belt by means of nuts 67, 68 and pivoted at its lower end at 69 to an operating lever 70 adapted to be raised or lowered to effect raising or lowering of a portion of a belt 64. When a portion of the belt is thus raised sediment or the like may pass through one or more apertures into the trough below. When the belt is lowered the openings are closed. Thus selective bleeding of the entire bottom portion of zones A and B of the tank is made possible and the treater may be operated for long periods of time without shutting down for cleaning purposes. Similarly, the treatment of the tube elements of the heater unit 13 with an oil wettable coating increases the life of the heater unit which otherwise would have to be removed or replaced at relatively frequent intervals owing to the high temperature maintained therein by reason of the fact that hot gases flow therethrough from one or more burners 100 as set forth in my Patents Nos. 2,495,673, 2,601,903 and 2,601,904.

As previously stated the general operation of the treater is much the same as that described in my Patent No. 2,601,903, the emulsion being introduced into the system under pressure and pressure being equalized throughout the system by gas equalizer pipes, the gas being withdrawn along with the clean oil and passed in countercurrent to the incoming emulsion in the preheater E. By reason of the fact that the preheater is confined to the upper zone A' and does not extend to the lower zone A² the bleeder F may be readily employed at both zones A and B where fall out of sediment is most prevalent. It will be further noted that the presence of gas in the outgoing fluid passing through the outer jacket of the heat exchanger E increases the insulating capacity of the heat exchanger so that relatively little heat is lost to the outside, an outer layer of gas being provided adjacent the outer wall of the treater tank in zone A'.

The invention has been described in detail for the purpose of illustration but it will be obvious that numerous modifications and variations may be resorted to without departing from the spirit of my invention within the scope of the accompanying claims.

I claim:
1. A method of protecting a heating tube element from scale formation which tube element is subjected on one side to an oil-water liquid mixture having a scale forming mineral constituent, and on the other side a heating fluid, which method comprises first coating the tube on the liquid mixture side with a preferentially oil wettable coating, then passing the oil-water liquid over the coated side of the tube, whereby said coated surface is additionally and continuously coated with oil which serves to protect against scale formation upon the tubing.

2. A process as set forth in claim 1, wherein the heating tube is initially coated with a thermosetting plastic.

3. A process as set forth in claim 1, wherein the heating tube is initially coated with an epoxy resin.

4. A process as set forth in claim 1, wherein the heating tube is initially coated with a phenol formaldehyde resin.

5. A process as set forth in claim 1, wherein the heating tube is initially coated with a silicone.

6. In an emulsion treating method, wherein an oil-water emulsion is subjected to the surface of a heating tube element in order to initially break the emulsion; the step which comprises protecting a heating tube element which is subjected on one side to an oil-water liquid mixture having a mineral oil constituent, and on the other side a heating fluid, by coating the tube on the liquid side with a preferentially oil wettable coating, and then passing the oil-water liquid over the coated side of the tube, whereby an additional coating of oil is continuously applied to the preferentially oil wettable coated tube.

7. A method of preventing scale formation on a metal surface subject to the application of heat and to an oil-water mixture having a mineral constituent which tends to deposit scale on the application of heat, which method comprises first coating the metal with a preferentially oil wettable plastic coating, then subjecting the coated surface to the flow of said oil-water mixture, whereby a film of oil is deposited on the coated metal surface, which serves to prevent the formation of scale on the surface.

References Cited in the file of this patent
UNITED STATES PATENTS

| | | |
|---|---|---|
| 2,261,057 | Erwin | Oct. 28, 1941 |
| 2,469,729 | Hunter | May 10, 1949 |
| 2,765,288 | Whittier et al. | Oct. 2, 1956 |
| 2,832,431 | Lovelady et al. | Apr. 29, 1958 |

FOREIGN PATENTS

| | | |
|---|---|---|
| 258,908 | Great Britain | Aug. 4, 1927 |